Dec. 3, 1968  N. O. TAYLOR ET AL  3,414,324
ADJUSTABLE CHAIR
Filed July 27, 1965  13 Sheets-Sheet 5
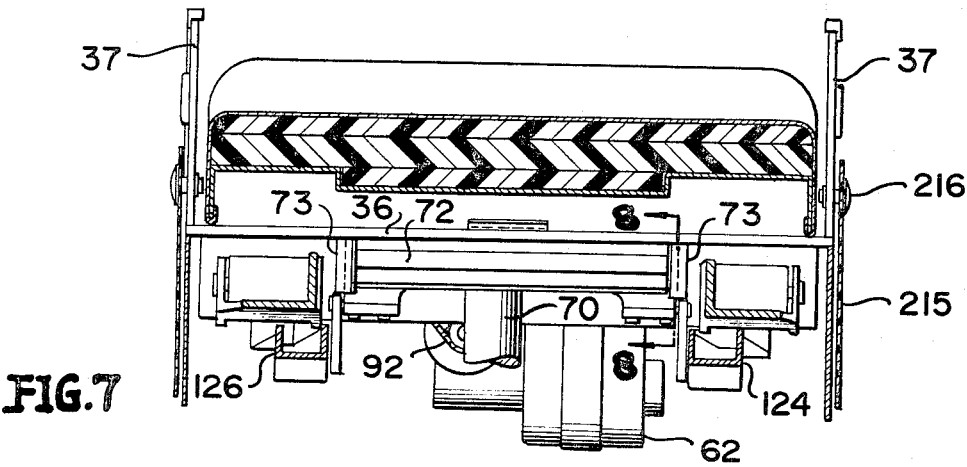
INVENTORS
NORRIS O. TAYLOR
WILMER P. UHLER
JOHN M. GARDELLA
& JIM C. CAHLIK
BY Mason, Porter, Diller & Brown
ATTORNEYS

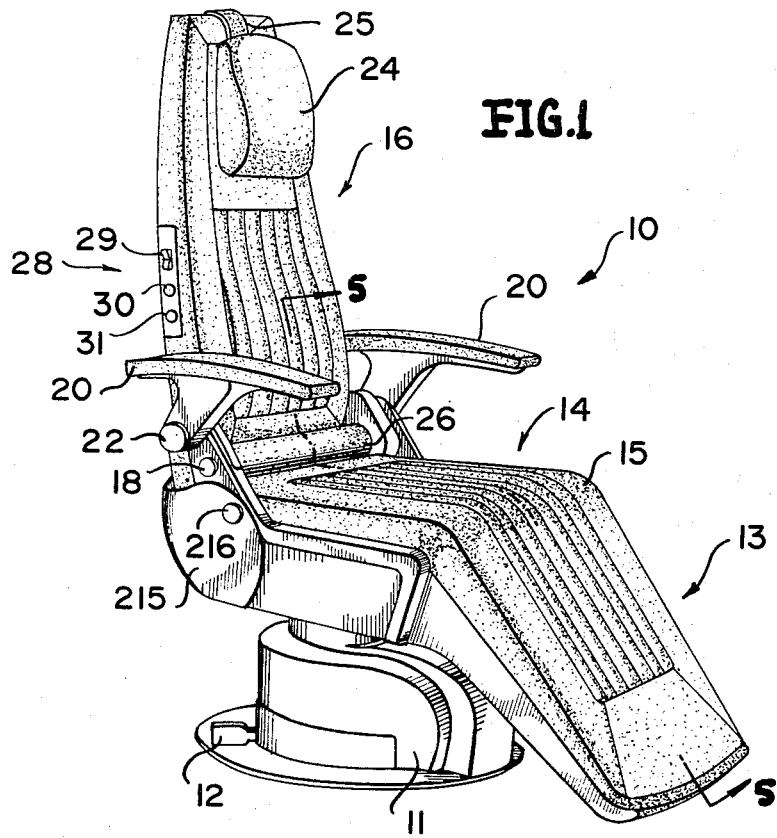

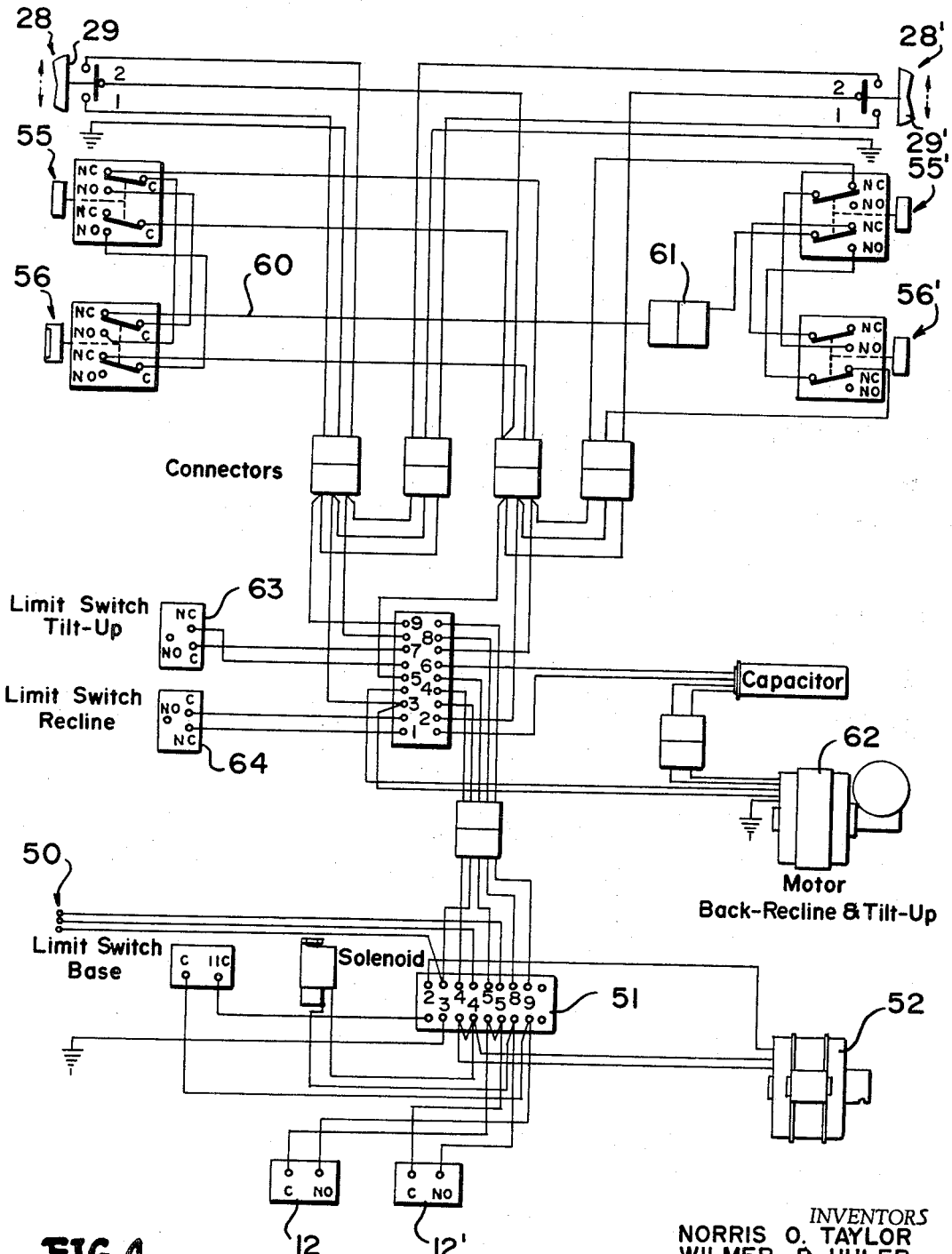

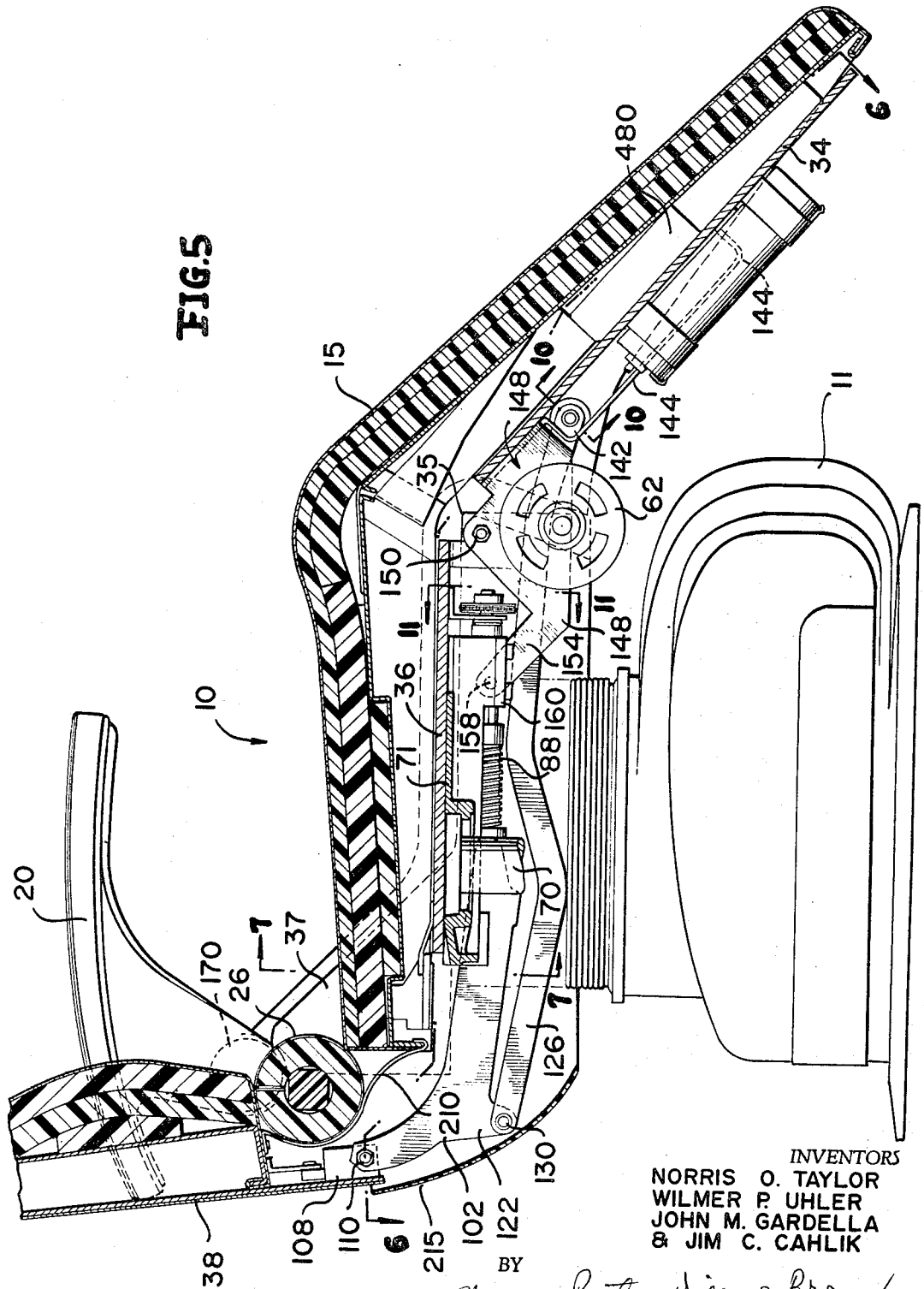

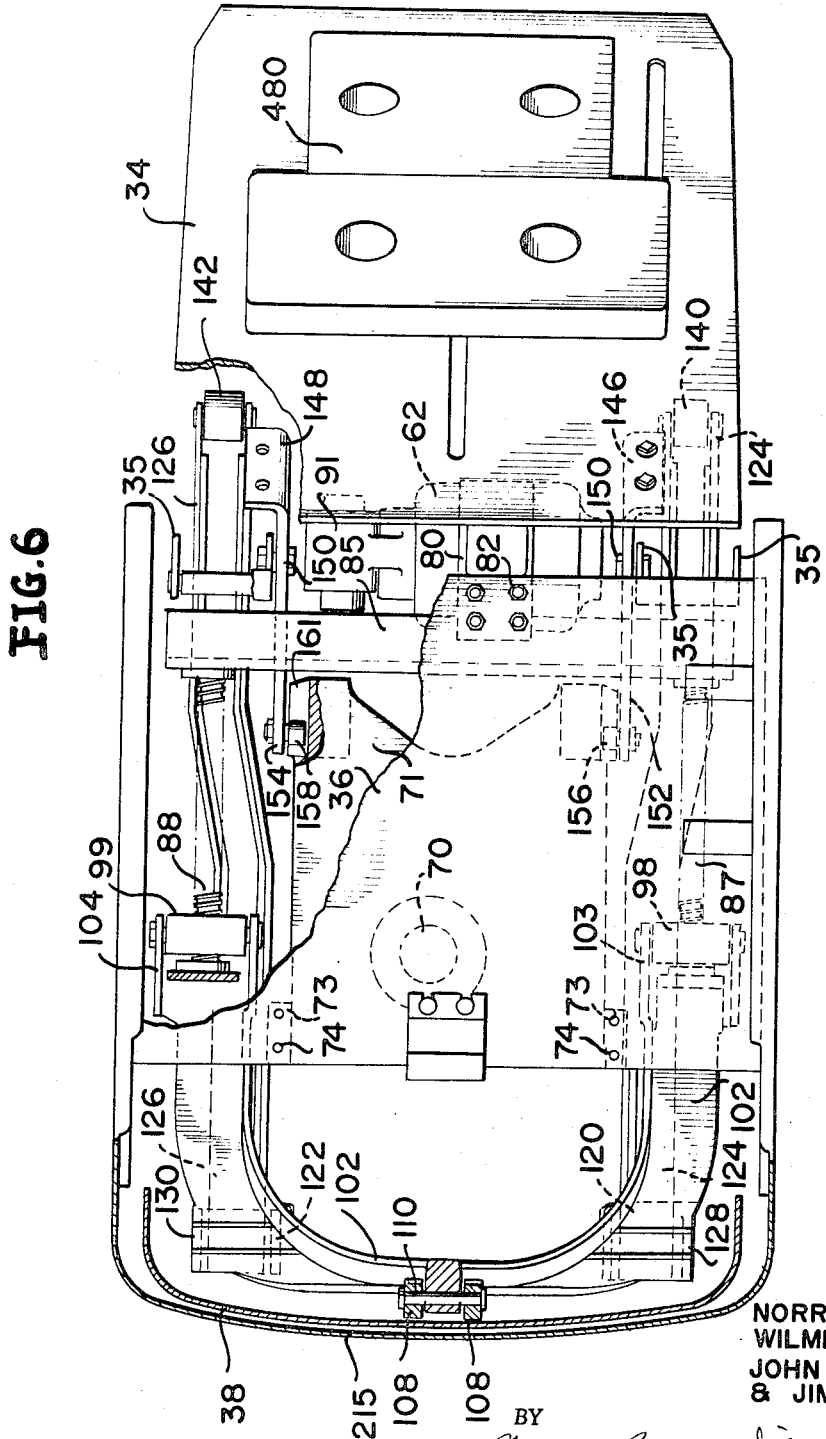

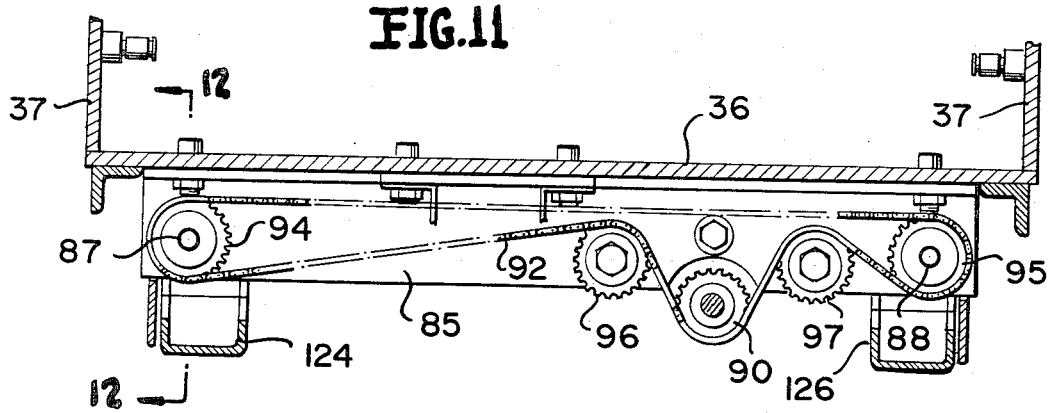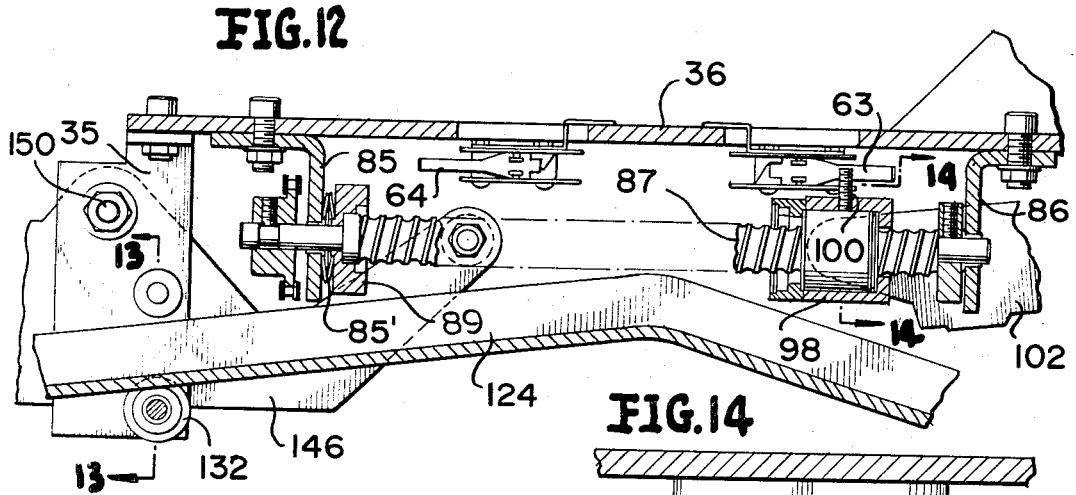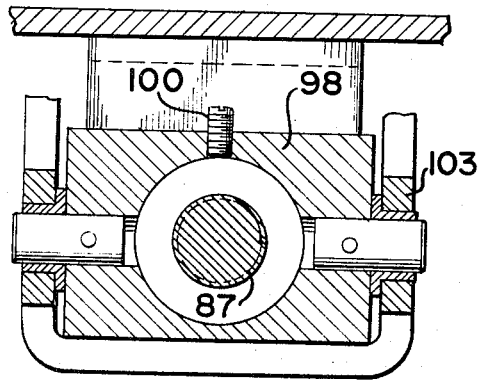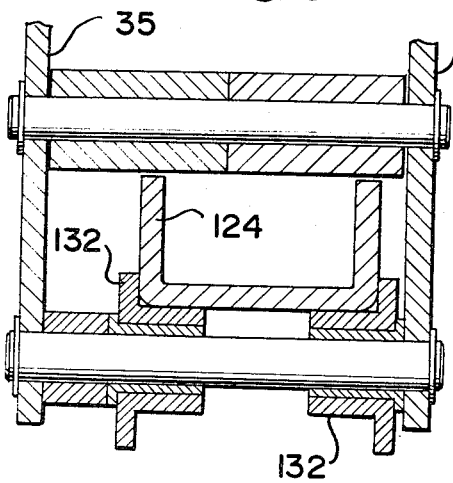

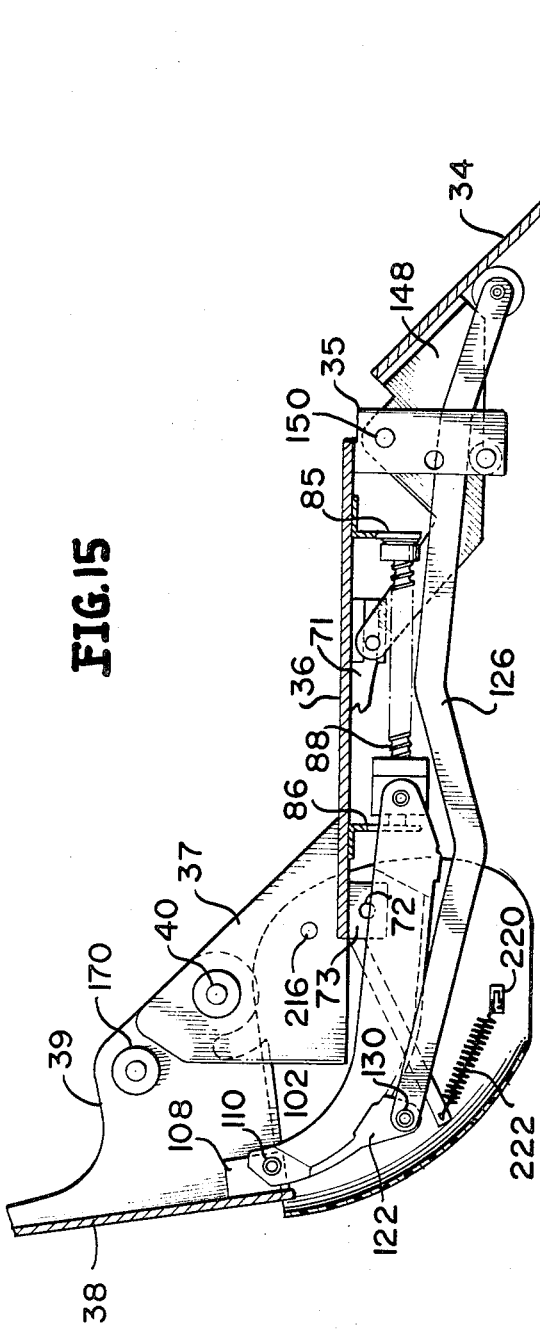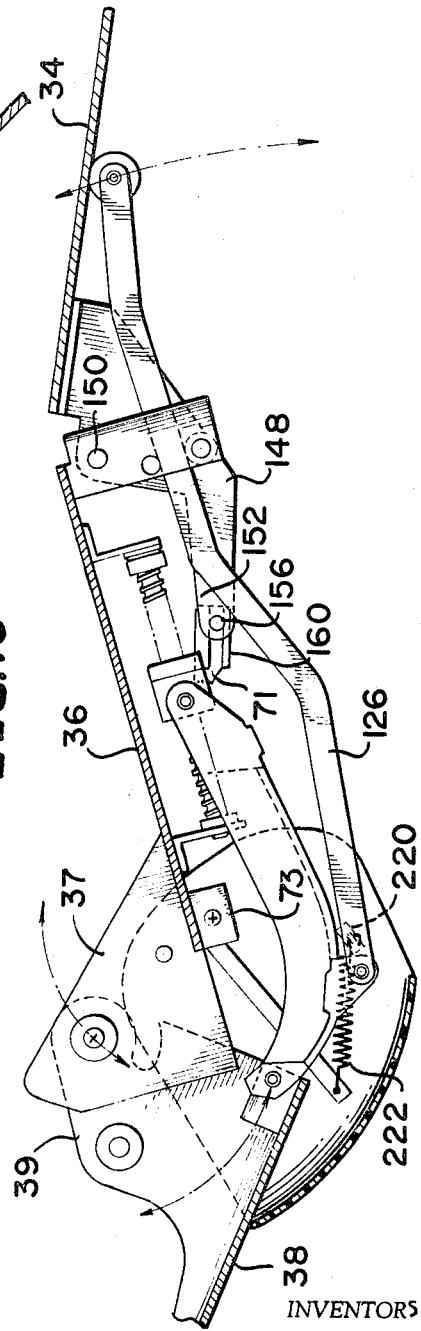

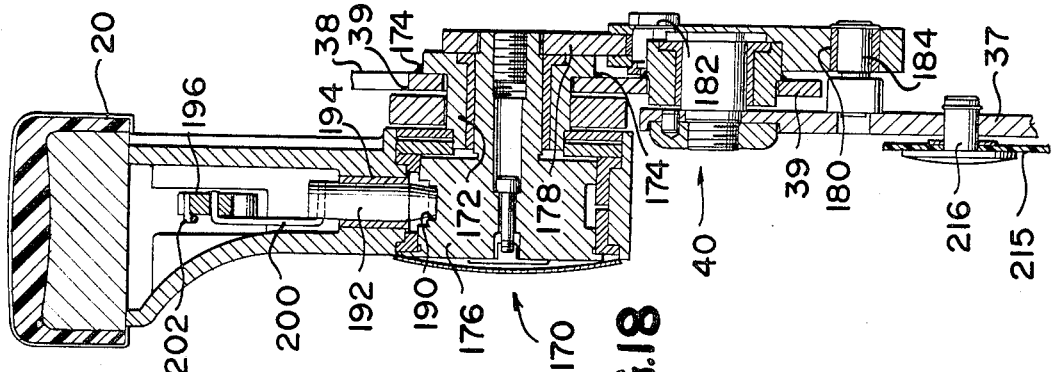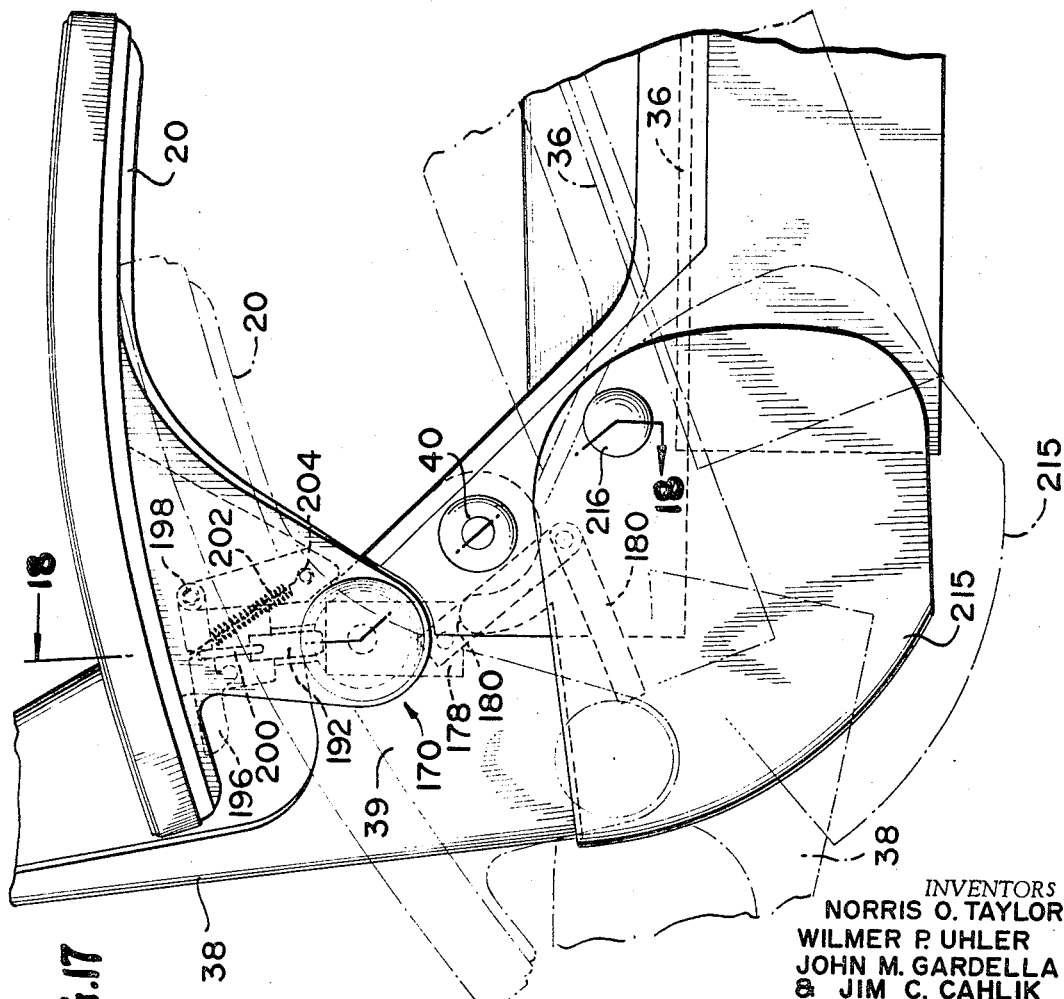

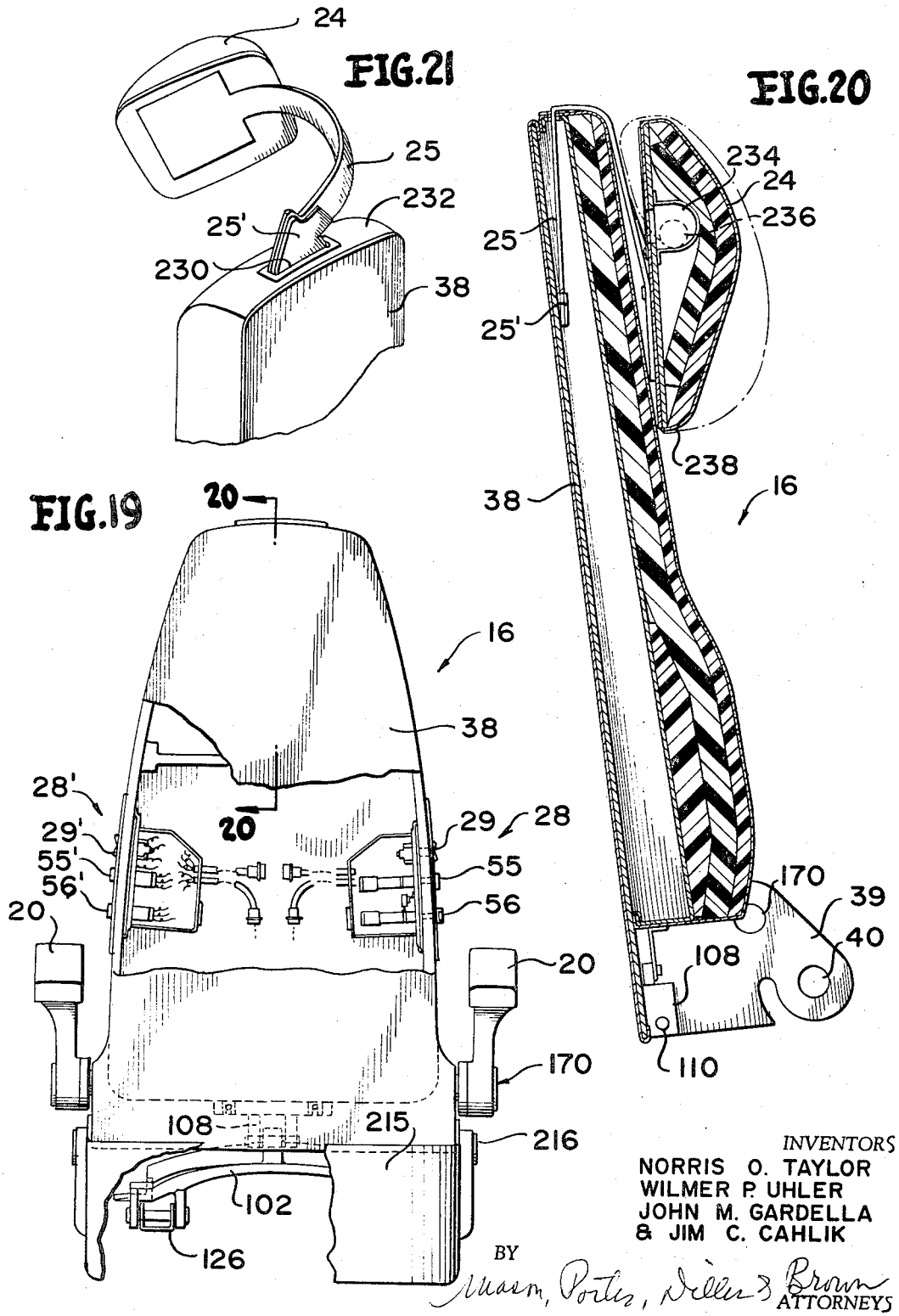

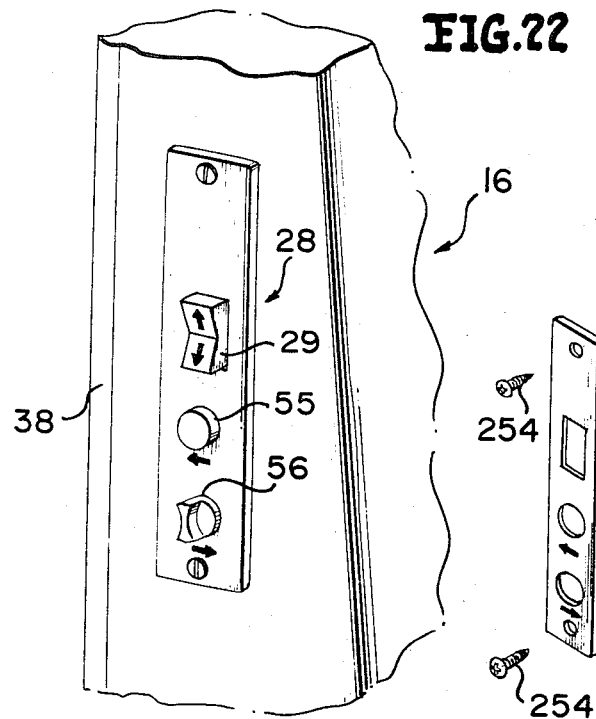
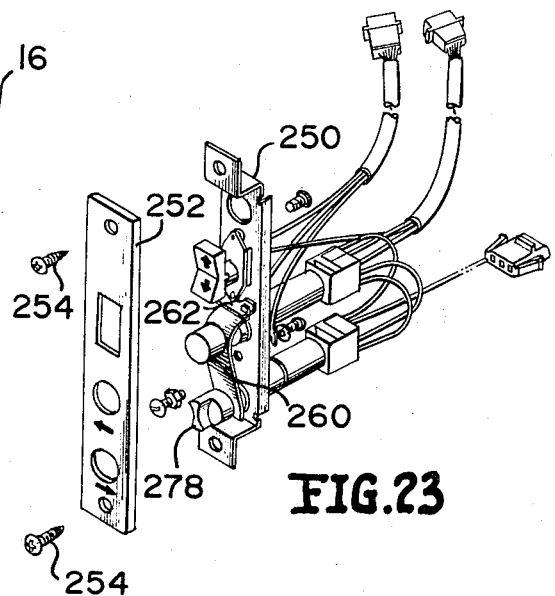
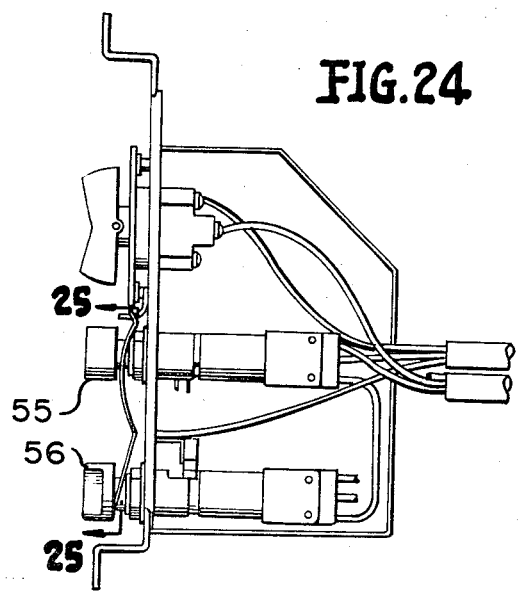
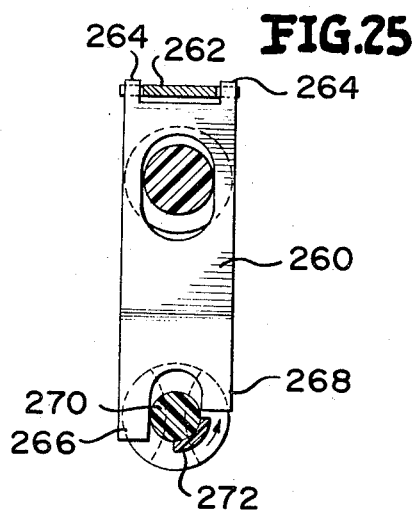
INVENTORS
NORRIS O. TAYLOR
WILMER P. UHLER
JOHN M. GARDELLA
& JIM C. CAHLIK
BY Mason, Porter, Diller & Brown
ATTORNEYS

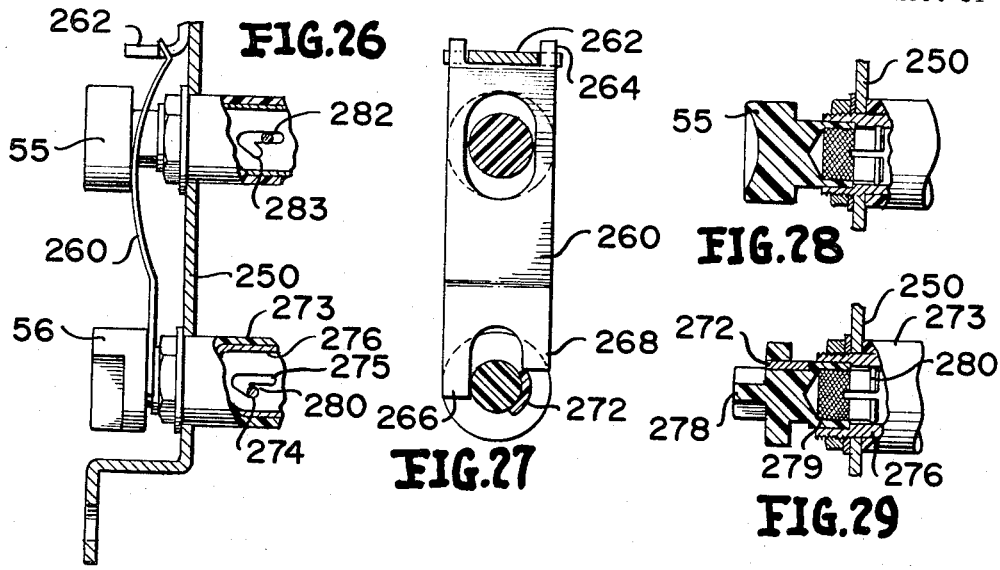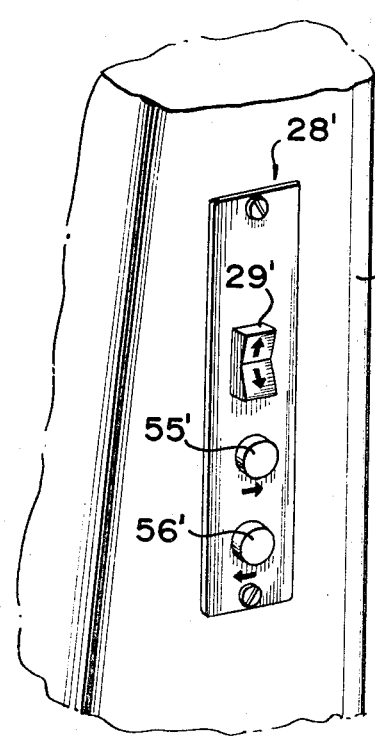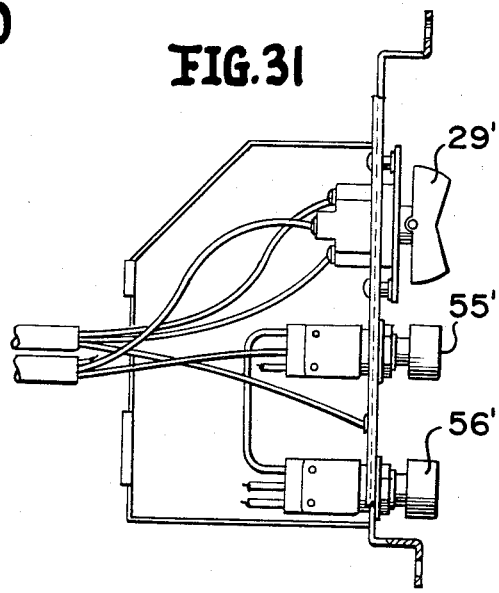

Dec. 3, 1968   N. O. TAYLOR ET AL   3,414,324
ADJUSTABLE CHAIR
Filed July 27, 1965   13 Sheets-Sheet 12
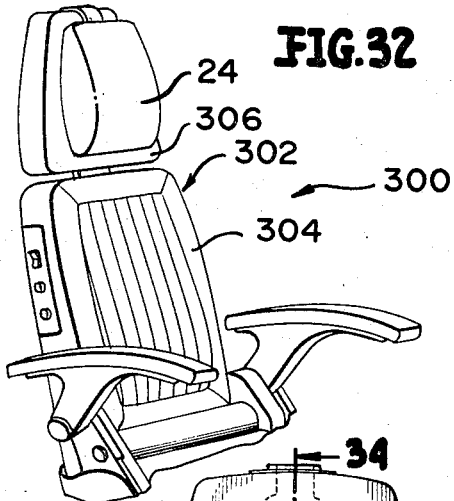
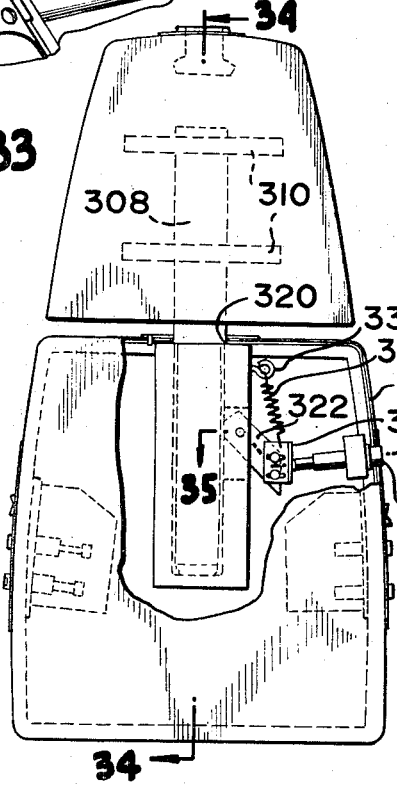
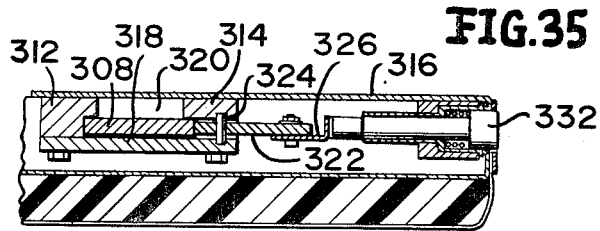
INVENTORS
NORRIS O. TAYLOR
WILMER P. UHLER
JOHN M. GARDELLA
& JIM C. CAHLIK
BY
Mason, Porter, Diller & Brown
ATTORNEYS

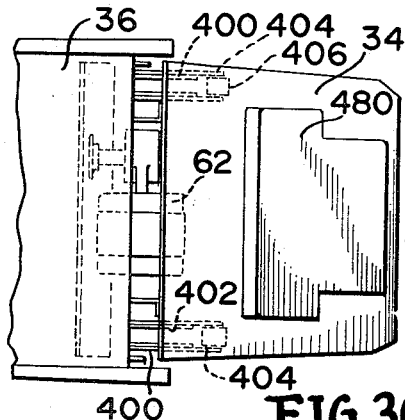
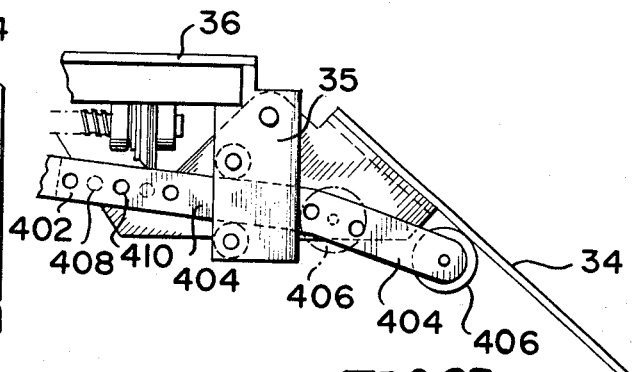
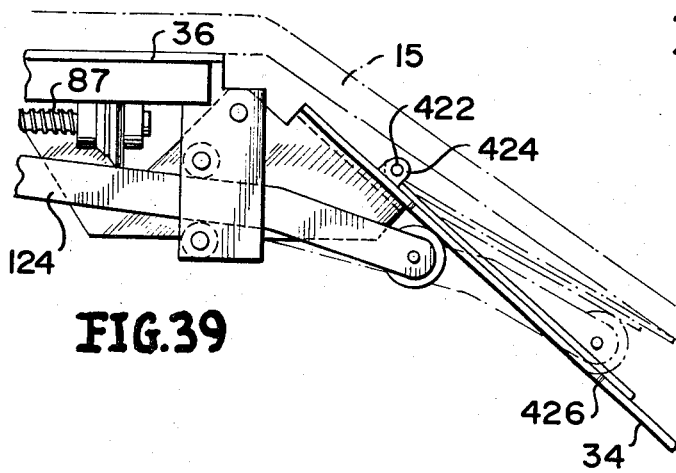
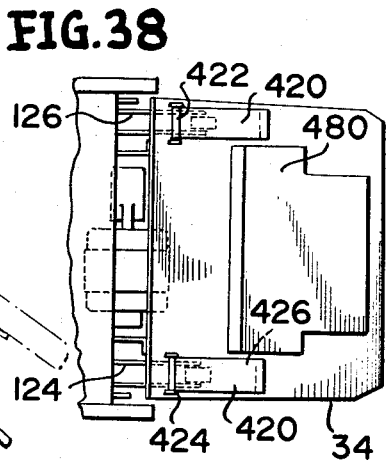
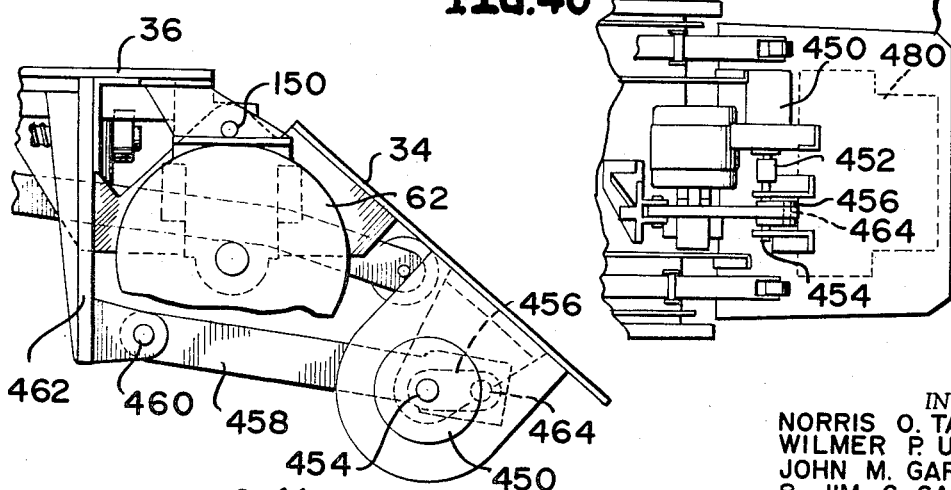

3,414,324
ADJUSTABLE CHAIR
Norris O. Taylor, Swarthmore, Pa., Wilmer P. Uhler
and John M. Gardella, Staten Island, N.Y., and Jim
Cahlik, Parma, Ohio, assignors, by mesne assignments,
to S. S. White Company, Philadelphia, Pa., a corporation of Pennsylvania
Filed July 27, 1965, Ser. No. 475,181
8 Claims. (Cl. 297—90)

ABSTRACT OF THE DISCLOSURE

A chair is provided with pivotal connections between a seat rest and a back rest, and between the seat rest and a leg rest, also with a thrust connection between the back rest and the leg rest and further with a driving connection between the back rest and a motor carried by the seat rest, so that by operation of the motor the back rest and the leg rest are adjustably movable relative to one another and the seat rest. A continuous cushion extends over the seat rest and the leg rest to provide an uninterrupted cushioned surface over these parts for all positions of the leg rest and the seat rest.

---

This invention relates to new and novel adjustable chairs, and more particularly to adjustable chairs which are ideally suited for use in the modern practice of dentistry.

An object of the present invention is to provide a dental chair of the type including a back rest, a seat rest, a leg rest and an arm rest wherein synchronous motions of various elements of the chair are designed such that a patient may be placed in the most convenient positions for the many and varied operations and allowing for the maximum function ability for a dentist or surgeon and yet retaining the dignity and comfort of the patient.

Another important object of the invention is the provision of an adjustable chair wherein a leg rest is pivotally mounted to a seat rest so as to provide a knee-break therebetween, and the provision of automatic positioning of the leg rest relative to the seat rest to provide the most comfortable position for a patient when the back rest is in either its upright position or when in its reclined position.

Another object of this invention is to provide single control means for actuating the various motions of the adjustable chair.

Another object of this invention is to provide separate control means so that various synchronous motions of the chair elements may be actuated from the "dentist's side" or from the "assistant's side" of the chair.

Another object of the invention is to provide an override control means so that the dentist's controls lock out the controls of the assistant thus maintaining control by the dentist.

Another object of this invention is to provide a new and novel switch means which, upon actuation, causes the back rest to return from a reclined position to a fully upright position.

A further object of this invention is to provide an adjustable chair wherein a back rest is pivotally mounted to a seat rest at a point above the plane of the seat rest so as to minimize rucking of an occupant's clothes as the back rest is pivoted from an upright position to a reclined position relative to the seat rest.

A further object of this invention is to provide an adjustable chair wherein the back rest is pivotable from an upright position to a fully reclined position wherein the back rest is inclined below a horizontal position so as to aid in reviving a patient who has fainted, by increasing blood circulation to the patient's head, or for placing a patient in position for some particular type of operation.

A further object of this invention is to provide a release mechanism for the arm rest whereby the arm rest is pivotally mounted on a portion of the back rest and is swingable away from the seat rest to provide for easy patient admittance and departure.

A further object of this invention is to provide a chair with a two-piece back rest portion thereby adapting the chair for use with interchangeable head rests.

Another object of this invention is to provide a shroud or cover plate which is pivotally mounted upon a rear portion of the seat rest so as to shield the actuating mechanism of the chair and prevent personal injuries.

A further object of this invention is to provide a novel transition roll which is located between the seat rest and the back rest thereby ensuring maximum patient comfort for all positions of the back rest relative to the seat rest.

A still further object of this invention is to provide an adjustable chair, of the type set forth above, wherein separate means are provided for adjusting the leg rest relative to the seat rest.

According to the invention, pivotal connections are provided for connecting the back rest and leg rest to the seat rest, and further provision of a thrust connection between the back rest and the leg rest plus a driving connection between the back rest and a motor carried by the seat rest permits the back rest and the leg rest to be adjustably moved relative to one another and the seat rest through operation of the motor. Optionally, a separate driving mechanism for the leg rest permits independent adjustment of the leg rest relative to the seat rest. With a continuous cushion extending over the seat rest and over the leg rest an uninterrupted cushioned surface is provided over these parts for all positions thereof.

With the above and other objects in view that will hereinafter appear, the nature of the invention will be more clearly understood by reference to the following detailed description, the appended claimed subject matter and the several views illustrated in the accompanying drawings:

In the drawings:

FIGURE 1 is a perspective view of an adjustable chair which is illustrative of the present invention.

FIGURE 2 is a diagrammatic view and illustrates the major chair elements in an upright position and, in broken lines, in a partially reclined position.

FIGURE 3 is a diagrammatic view, similar to FIGURE 2, and illustrates the chair elements, in broken lines, in a more fully reclined position, and in full lines, illustrates the chair elements with the back rest thereof being in a fully reclined position so as to be inclined below the horizontal.

FIGURE 4 is a schematic diagram illustrating the various electrical components incorporated in the adjustable chair.

FIGURE 5 is a vertical sectional view, taken on line 5—5 of FIGURE 1, and illustrates the mechanism for actuating the pivotal movements of the major chair elements.

FIGURE 6 is a transverse sectional view, taken on line 6—6 of FIGURE 5, and illustrates the seat rest and leg rest with portions broken away to show a portion of the thrust means for pivoting the leg rest and seat rest.

FIGURE 7 is a vertical sectional view, taken on line 7—7 of FIGURE 5 and illustrates a pair of supporting members fixedly secured to the seat rest and pivotally supporting the shroud member.

FIGURE 8 is a vertical sectional view, taken along line 8—8 of FIGURE 7 and illustrates a cross head which is attached to the piston rod of a conventional lift mechanism, and also illustrates the pivotal mounting of the seat rest to the cross head.

FIGURE 9 is a vertical sectional view, taken on line 9—9 of FIGURE 8, and illustrates a guide slot which is formed on the cross head for cooperation with an extension of a link which is fixedly secured to the underside of the leg rest.

FIGURE 10 is a sectional view, taken on line 10—10 of FIGURE 5, and illustrates the mounting of a roller on the forward end of the thrust bar mechanism.

FIGURE 11 is a vertical transverse sectional view, taken on line 11—11 of FIGURE 5, and shows the arrangement of drive sprockets and idler sprockets for connecting the actuating motor to the operating mechanisms.

FIGURE 12 is a vertical sectional view, taken on line 12—12 of FIGURE 11, and shows, in elevation, the arrangement of one of a pair of operating screws mounted for rotation on the underside of the seat rest.

FIGURE 13 is a sectional view, taken on line 13—13 of FIGURE 12, and illustrates a guide arrangement for guiding the movement of a channel-shaped thrust bar.

FIGURE 14 is a sectional view, taken on line 14—14 of FIGURE 12, and illustrates a manner in which a nut member on the screw is pivotally secured to a forward portion of a yoke member.

FIGURE 15 is a sectional view, with parts broken away for clarity, and illustrates the position of the seat rest and leg rest when the back rest is in its substantially upright position.

FIGURE 16 is a sectional view, similar to FIGURE 15, and illustrates the position of the seat rest and leg rest with the back rest in a reclined position.

FIGURE 17 is a partial plan view showing the arm rest being pivotally mounted to a portion of the back rest and being pivotally mounted therewith relative to the seat rest.

FIGURE 18 is a sectional view, taken on line 18—18 of FIGURE 17, and illustrates the manner in which the arm rest is pivotally mounted upon a forwardly extending flange portion of the back rest, and also showing the pivotal mountings for connecting the back rest and shroud to upstanding support members on the seat rest.

FIGURE 19 is a rear elevational view, with portions broken away for clarity, and illustrates a set of control switches being mounted at each side of the back rest.

FIGURE 20 is a vertical sectional view, taken on line 20—20 of FIGURE 19 and illustrates the manner in which an adjustably positionable head rest is mounted upon the back rest.

FIGURE 21 is a fragmentary perspective view of the back rest and the head rest, with the head rest in a partially assembled position relative to the back rest.

FIGURE 22 is a fragmentary perspective view of the switches and mounting plate which are located on the dentist's side of the back rest.

FIGURE 23 is a partially exploded view of the switches which are located on the dentist's side of the chair.

FIGURE 24 is an elevational view of the assembled switches which are illustrated in FIGURE 23.

FIGURE 25 is an enlarged sectional view, taken on line 25—25 of FIGURE 24, and shows a novel spring member which is mounted between the "recline" switch and the "tilt-up" switch on the dentist's side of the back rest.

FIGURE 26 is a fragmentary view illustrating the "tilt-up" switch in a fully depressed and locked position, and illustrates the "recline" switch in a released position, and also shows the novel spring member in a bowed position which results from engagement of the spring member by a cam located upon the "tilt-up" switch.

FIGURE 27 is a view similar to FIGURE 25 and illustrates the cam on the "tilt-up" switch engaged with the spring member for causing distortion thereof.

FIGURE 28 is a cross-sectional view of the pushbutton portion of the "recline" switch.

FIGURE 29 is a cross-sectional view of the pushbutton portion of the "tilt-up" switch.

FIGURE 30 is a fragmentary perspective view of the switches and mounting plate located on the assistant's side of the back rest.

FIGURE 31 is a sectional view of the assistant's control switch and shows a portion of the wiring therefor.

FIGURE 32 is a fragmentary perspective view of a modified form of a back rest wherein an upper portion of the back rest is removable from a lower portion thereof to provide for interchnageability of head rests.

FIGURE 33 is a front elevational diagrammatic view of the two-piece back rest, with portions broken away for clarity, and illustrates the adjusting mechanism for adjustably positioning the upper portion of the two-piece back rest relative to the lower portion thereof.

FIGURE 34 is a vertical section, taken on line 34—34 of FIGURE 33, and illustrates a support rod fixedly secured to the top portion of the back rest and slidably received within a guide slot in the lower portion of the back rest.

FIGURE 35 is a sectional view, taken on line 35—35 of FIGURE 33, and illustrates the control means for effecting adjustment of the support rod within the lower portion of the back rest.

FIGURE 36 is a plan view of a modified form of seat rest and leg rest wherein an adjusting mechanism is provided for selectively adjusting the leg rest relative to the seat rest.

FIGURE 37 is a fragmentary elevational view, of FIGURE 36, and illustrates the manner in which a pair of channels can be adjusted in length to provide for adjusting the leg rest relative to the seat rest.

FIGURE 38 is a plan view of another modification of the invention wherein the leg rest and seat rest are provided with an adjusting mechanism for varying the inclination of the leg rest relative to the seat rest.

FIGURE 39 is a fragmentary elevational view of FIGURE 38 and illustrates the pivotal mounting for one of a pair of plate members on the top side of the leg rest.

FIGURE 40 is a view of the underside of a leg rest and seat rest wherein a further modification of the invention includes a separate motor mounted on the underside of the leg rest and cooperating with a crank for varying the inclination of the leg rest relative to the seat rest.

FIGURE 41 is a fragmentary elevational view and illustrates the manner in which the motor and crank are connected between the seat rest and the leg rest.

Referring to the drawings in detail, there is illustrated in FIGURE 1 a new and novel adjustable chair, generally indicated by the numeral 10, which chair is particularly adapted for use in the practice of dentistry. The chair 10 includes a conventional lift-mechanism 11, which may be actuated by a conventional foot-operated switch 12 for vertically raising and lowering the chair 10.

A forwardmost portion of the chair 10 comprises a leg rest portion 13 which depends forwardly and downwardly from a seat rest portion 14. The leg rest portion 13 and seat rest portion 14 includes a cushion member 15 which extends, without interruption, from a rearward portion of the seat rest portion 14 to a lower portion of the leg rest portion 13 so as to provide a continuous uninterrupted supporting surface.

A back rest portion 16 is pivotally mounted, at 18, to an upstanding portion of the seat rest portion 14, and has a pair of arm rests 20 pivotally connected thereto, at 22. The back rest portion 16 has a head rest 24 adjustably mounted thereon by a strap member 25. The transition roll 26 is located at the juncture between the seat rest portion 14 and the back rest portion 16 so as to provide a continuous supporting surface between the seat rest portion 14 and the back rest portion 16 regardless of any changes in the relative position of the back rest portion 16 and seat rest portion 14.

Control means 28 are located on a side of the back rest portion 16 and include a rocker switch 29 for vertically raising and lowering the chair 10, a pushbutton 30 for moving the back rest portion 16 to a reclined position, and a second pushbutton switch 31 for moving the back rest portion 16 to an upright position. The rocker switch 29 actuates the lift-mechanism 11 in the same manner as the foot-operated switch 12 so that the chair 10 may be adjusted by the switch which is most conveniently located for the dentist during any given operation. As will be more fully described, a dual set of control means is located on the other side of the back rest portion 16 so that the dentist's assistant is also provided with convenient control for varying the positions of the chair 10.

FIGURES 2 and 3 are diagrammatic illustrations of the major elements of the chair 10. The full line position of FIGURE 2 illustrates a leg rest 34 pivotally mounted to a bracket 35 which is fixedly secured to a seat rest 36. The seat rest 36 has a pair of supporting members 37 fixedly attached thereto along lateral edges at the rearmost portion thereof, and a back rest 38 includes a pair of forwardly extending flange portions which are pivotally connected to the support members 37, at 40, above the plane of the seat rest 36.

Actuating means, generally indicated by the numeral 45, are provided for adjustably positioning the various elements of the chair 10. It will be apparent from a comparison of the full-line positions and the broken-line positions of FIGURES 2 and 3, that the actuating mechanism 45 causes the back rest 38 to be movable from the upright position of FIGURE 2 through a series of intermediate positions to a completely reclined position wherein the back rest 38 is inclined at an angle of approximately 8 degrees below the horizontal, as is shown in the full line position of FIGURE 3.

A general understanding of the operation of the chair 10 will become apparent by consideration of the wiring diagram illustrated in FIGURE 4. A power supply, generally indicated by the numeral 50, is connected to a terminal board 51 to provide power for operating the various mechanisms. The conventional lifting mechanism 11 is actuated by a motor 52 which is controlled by the foot-operated switch mechanisms 12 and 12', located at the base of the chair 10, or by the control means 28 and 28' which are located along opposite sides of the back rest portion 16. Movement of the switch 12 from its normally opened position to the closed position will actuate the motor 52 and thus causing the chair 10 to raise. In order to lower the chair 10, it is necessary to actuate the switch 12' so as to open an oil-release solenoid valve thus permitting the chair 10 to lower.

The second point at which the chair 10 can be raised or lowered is at either of the control panels 28 or 28'. The rocker switches 29 and 29' are conventional three-position switches which are normally open. When the upper portion of either rocker switch 29 or 29' is pressed, the motor 52 starts and causes the chair 10 to raise. Pressing the lower portion of either of the rocker switches 29 or 29' causes a conventional solenoid valve to open which releases the oil pressure in the lift mechanism 11, thus permitting the chair 10 to lower. If by accident, the foot lever 12 and either of rocker switches 29 and 29' are actuated for opposing motions, no harm will come to the chair 10 although this is not recommended.

The reclining and tilting-up operation of the chair 10 is controlled by push button switches 55 and 55', and 56 and 56', respectively. Switches 55 and 56 are located at the control panel 28 on the dentist's side of the chair 10, while the switches 55' and 56' are located at the control panel 28' on the assistant's side of the chair. The chair 10 can be brought to any angle of recline by simply pressing the correct switch for the desired motion. Pressing the switch 55 or 55' would recline the chair 10 and, by releasing the finger pressure from the switch, the chair motion will stop at any angle desired. Switches 55 and 56' will tilt the chair 10, i.e. the back rest 38, up from the horizontal position. This operation can be accomplished by either pressing the switch 56 or 56', and holding it, or the switch 56 can be pushed in and then pushed clockwise to a lock and hold position. The switch will hold in this position throughout the travel of the chair and return to its normal position when the "recline" switch 55 is actuated. This feature of the invention will be more clearly defined with the explanation of FIGURES 24–27.

An important feature of this invention is that means are provided whereby the dentist's controls will override any command given by the assistant's controls. From a consideration of FIGURE 4, it will be apparent that power is fed to the assistant's switches 55' and 56' through the wire 60 and connector 61. Tracing the wire 60 through the dentist's switches 56 and 55 will show a complete circuit so that actuation of either of the assistant's switches 55' or 56' will cause the respective desired motion of the chair. However, if the dentist presses either switch 55 to cause the chair to recline, or pushes the switch 56 to cause the chair to tilt up, the circuit to the assistant's switches 55' and 56', through wire 60 and connector 61 is broken so that no conflicting signals can be given to the assistant's switches.

The reclining mechanism for the chair 10 is operated by motor 62 which is preferably a single phase A.C. reversible motor. A limit switch 63 is provided for shutting off motor 62 when the chair has reached its "upright" position, and a similar limit switch 64 is provided for shutting off motor 62 when the chair has reached its extreme recline position.

As is shown in FIGURES 5–8 a plunger or piston rod 70 extends upwardly from the chair base 11 and is part of a conventional mechanism for raising and lowering the chair 10. A horizontally disposed crosshead 71 is bolted or otherwise secured to the plunger 70 so as to be maintained in a substantially horizontal position. A pivot rod 72, see FIGURE 8, is carried by crosshead 71 and is transversely aligned at the rearmost portion of the crosshead 71. A pair of pivot blocks 73 are pivotally mounted upon the rod 72 at the lateral edges of the crosshead 71. A plurality of screws 74 are provided for fixedly securing the seat rest 36 to pivot blocks 33 such that the seat rest 36 is mounted on the pivot rod 72 for pivotal motion relative to the crosshead 71 and plunger or piston rod 70.

As is best shown in FIGURES 5, 15 and 16 a pair of upstanding support plate members 37 are fixedly secured to the rearwardmost lateral edge portions of the seat rest 36. The back rest 38 is provided with a pair of lateral flange portions 39 which extend forwardly from a lowermost portion thereof. Flange portions 39 are each pivotally secured to a respective one of the pair of support plate members 37 so that the back rest 38 is mounted for pivotal motion, at 40, between an upper position to a fully reclined position wherein, as is shown in FIGURE 3, the back rest 38 is positionable at approximately 8 degrees below the horizontal.

The chair 10 is operated between the recline and upright positions by the motor 62. The motor 62 is provided with support bracket means 80 (see FIGURE 6) which is fixedly secured to a front underside portion of the seat rest 36 by a plurality of bolts 82. As is clearly shown in FIGURES 6, 11 and 12, a forward support bracket 85 is secured to and extends transversely of a front portion of the seat rest 36, and cooperates with a rearward support bracket 86, for supporting a pair of parallel screws 87 and 88 beneath lateral edges of the seat rest 36. As is clearly shown in FIGURE 12, a pair of beveled washers 85' are mounted on each of screws 87 and 88 between the forward support bracket 85 and a collar 89 on the respective screw to equalize loading on the screws 87 and 88 and to compensate for wear. A drive sprocket 90 is mounted upon the forward support bracket 85 and is driven by the motor 62 through a gear reducer 92. A drive chain 92 partially encircles the drive sprocket 90 and extends about a driven sprocket 94, which is secured to drive screw 87, and also extends about driven sprocket 95 which is secured to drive screw 88. A pair of idler sprockets 96 and 97 are mounted for rotation on bracket 85, and it is preferable that the idler sprocket 96 be adjustably mounted upon the bracket 85 so as to provide a means for increasing or decreasing tension in the drive chain 92.

Each of the screws 87 and 88 is provided, respectively, with a ball nut 98 and 99 which are mounted for translation thereon. As is best shown in FIGURES 12 and 14, the ball nut 98 is provided with a post 100 which is disposed thereabove for cooperating with limit switch 63 to stop the motor 62 when the back rest 38 reaches its fully upright position, and also cooperates with limit switch 64 for stopping motor 62 when the back rest 38 reaches its ful'y reclined position.

A generally U-shaped yoke member 102 is provided at each of its forwardly extending leg members with a bifurcated bracket 103 and 104 for pivotally connecting the yoke member 102 to a respective one of the ball nuts 98 and 99, in the manner best illustrated in FIGURES 6 and 14. As is clearly shown in FIGURES 5 and 6, a pair of brackets 108 are fixedly secured to a central lowermost portion of the back rest 38 and are pivotally connected to the bight portion of the U-shaped yoke member by a pivot pin 110. Upon actuation of either of the pushbutton switches 56 and 56', the motor 62 drives through gear reducer 91 to rotate the screws 87 and 88 thus causing ball nuts 98 and 99 to move forwardly beneath the seat rest 36 and exerts a force upon brackets 108 so as to pivot the back rest 38 toward a reclined position about the pivot 40.

Each side of the yoke member 102 is provided with a depending boss 120 and 122. A pair of thrust bars 124 and 126 are pivotal'y connected to the bosses 120 and 122 by pivot means 128 and 130 respectively. Thrust bars 124 and 126 extend forwardly along laterial edge portions beneath the seat rest 36 and, as is best shown in FIGURES 2, 6, 12 and 13, the thrust bars are guidingly mounted upon roller members 132 and 134, which are in turn supported by depending brackets 35. The forwardmost end portions of the thrust bars 124 and 126 have rotatably mounted thereon a pair of roller members 140 and 142, respectively, which are guided for movement along the underside of the seat rest 36 by suitable U-shaped guide members 144, as is best shown in FIGURES 5 and 10. It is obvious that a function of guide members 144 is to preclude inadvertent pivotal movement of the chair 10 toward a reclined position about pivot rod 72 on the crosshead 71.

As is best shown in FIGURES 6 and 15, a pair of links 146 and 148 are fixedly secured to uppermost lateral portions of the leg rest 34 and are pivotally connected on pivot pins 150 which are carried by the brackets 35 which depend from the seat rest 36. Links 146 and 148 have rearwardly extending legs 152 and 154, respectively, and carry roller members 156 and 158. As is clearly shown in FIGURES 5–8, a pair of guide plates 160 and 161 are fixedly secured by suitable screws 162 to the underside of crosshead 71 to provide guide slots 164 for receiving therein the roller members 156 and 158. Such an arrangement provides for a lost motion connection between respective roller member 156 and 158 with the crosshead 71.

Actuation of either of the push button switches 55 or 55' causes the motor 62 to rotate the parallel screws 87 and 88 such that the ball nuts 98 and 99 are moved forwardly thereon and causes the yoke member 102 to rotate the back rest 38 about the pivot 40. As the yoke member 102 moves downwardly and forwardly, the thrust bars 124 and 126 are driven forwardly to cause the leg rest 34 to move upwardly. The roller members 156 and 158 are restrained within the guide slots 164 and vertical movement is precluded. Consequently, the links 146 and 148 rotate upwardly about the axis of roller members 156 and 158 to cause upward movement of the pivot pin 150 and brackets 35. As a result, seat rest 36 is pivoted upwardly about the axis of pivot rod 72.

As a result of the foregoing operation, the chair 10 is moved from an upright position toward the reclined position. Continued actuation of the switches 55 or 55' will cause the back rest 38 to assume the fully reclined position which is best illustrated by the full line position of FIGURE 3. When the back rest 38 reaches the fully reclined position, the ball nut 98 actuates the limit switch 63 to deactivate the motor 62, and movement of the chair 10 ceases. Actuation of either of the switches 56 or 56' reverses the operation of motor 62 such that the back rest 38, the leg rest 34 and the seat rest 36 are rotated from the reclined position toward the upright position.

It is desirable that the arm rest 20 be moved in synchronism with the seat rest 36 and back rest 38. As is clearly shown in FIGURES 2, 17 and 18, each of the arm rests 20 is pivotally mounted at 170, on a respective one of the lateral flange portions 39 which are integral with the back rest 38. As is best shown in FIGURE 18, the sleeve 172 is fixedly secured, such as by welds 174, to a respective flange portion 39. The pivot shaft 176 is mounted for rotation within the sleeve 172 and carried therewith as the back rest 38 rotates about the pivot 40. It is desirable that the arm rest 20 be maintained in substantially parallel relation to the seat rest 36, as the seat rest 36 rotates about pivot rod 72. Therefore, a crank arm 178 is mounted upon the pivot shaft 176 for rotation therewith. An arm link 180 has one end thereof pivotally connected to the crank arm 178, at 182, and the other end of the arm link 180 is pivotally connected, at 184, to the support member 37 which extends upwardly from the seat rest 36. As the back rest 38 pivots relative to the seat rest 36, the pivot shaft 176 is carried with the back rest 38 but rotates within the sleeve 172 such that the arm rest 20 is maintained in substantially parallel relation to the seat rest 36.

In order to provide for easy admittance and departure from the chair 10, it is desirable that the arm rests 20 be adapted to swing up and out of the way. As is shown in FIGURES 17 and 18, the pivot shaft 176 is provided with a substantially radially disposed opening 190 for receiving a locking member or pin 192 therein. A bushing 194 is fixedly mounted within the arm rest 20 and provides for sliding motion of the pin 192 therein. A release lever 196 is pivotally mounted to the arm rest 20 at 198, and is connected to the locking member or pin 192 by a link 200. The rearward portion of the release lever 196 is disposed in an accessible position at the rear of arm rests 20 such that upward motion of the release lever 196 will raise the locking member or pin 192 from within the opening 190 and thus permit arm rests 20 to freely rotate about the pivot shaft 176.

In order to assure that pin 192 seats within the opening 190, a spring 202 has one end attached to the release lever 196 and the other end is connected to a stud 204 which is provided on the arm rests 20. Thus, the release lever 196 is continually biased in a counterclockwise direction about the pivot 198, as is shown in FIGURE 17, such that the locking member or pin 192 is seated within opening 190.

The transition roll 26 is best illustrated in FIGURES 1 and 5. The transition roll 26 is a separate, pillow-like member which is formed of resilient deformable material, such as foam rubber or the like. The transition roll 26 is placed between the back rest 38 and the seat rest 36, and is held in position by a support bracket 210, as is shown in FIGURE 5, and by frictional engagement with the seat rest portion 14 and the back rest portion 16. As the back rest 38 pivots to a reclined position, the transition roll 26 is squeezed between the seat rest portion 14 and the back rest portion 16 so as to provide a comfortable cushion-piece to support the occupant's lower back portion. The transition roll 26 is unique in that no gap exists between the lowermost portion of the back rest portion 16 and the rearwardmost portion of the seat rest portion 14 at any time during movement of the chair 10 to a reclined or upright position.

In modern professional practice, it is becoming more conventional for the dentist to be in a seated position during operation upon a patient. As a result, the dentist's knees are located closely adjacent to the lower rear portion of the chair 10. In order to avoid interference with the yoke member 102, and to preclude possible injury to the dentist, it is a feature of this invention to provide a cover plate or shroud 215 to provide an absolutely clear back rest free from all protrusions, thus eliminating any knee interference. As is shown in FIGURES 1, 17 and 18, the shroud 215 is provided with a pivot stud 216 and is pivotally mounted upon the upstanding support members 37 at opposite sides of the rear of the seat portion 36. As is shown in FIGURE 16, a hook 220 is provided on the shroud 215, and a spring 222 connects the hook 220 to a chair frame extension such that the shroud 215 is biased upwardly toward engagement with the back rest 38.

As is shown in FIGURE 19, the control means 28 and 28' are mounted on opposite side edges of the back rest portion 16. As was pointed out above, in connection with FIGURE 4, the dentist's controls 28 override commands initiated at the assistant's controls 28' so that the dentist retains final control for moving the chair between the upright and reclined positions.

FIGURES 20 and 21 illustrate the manner in which the head rest 24 is adjustably mounted on the back rest portion 16. The strap 25 is fixedly secured to a rear portion of the head rest 24, and is provided with a weight 25'. The weight 25' and a portion of the strap 25 are insertable within an opening 230 which is located in the top portion 232 of the back rest portion 16. Head rest 24 is preferably provided with a storage compartment 234 for storing a roll of sanitary paper 236, and the paper 236 can be entrained over the top of the head rest 24 and be fastened at the bottom of the head rest 24 by a combined holding-and-cutting strap 238.

The dentists's controls 28 are illustrated in FIGURES 22–29. The rocker switch 29, and the pushbutton switches 55 and 56 are mounted upon a support bracket 250 which is fixedly secured to the dentist's side of the back rest portion 16 by an exterior cover plate 252 and a pair of suitable screws 254.

A feature of this invention is the provision of a leaf spring 260 which extends between the switches 45 and 56. A stop lug 262 is centrally mounted upon the bracket 250 intermediate the switches 29 and 55. The spring 260 includes a pair of ears 264 mounted in a pair of slots in the stop lug 262. The opposite end of spring 260 is provided with a pair of extension arms 266 and 268 which extend on opposite side portions of a reduced portion 270 of the switch 56. A cam 272 is fixedly secured to the reduced portion 270 and is disposed for engagement with the free edge of extension arm 268.

After the dentist has completed his work upon a patient, the pushbutton switch 56 is depressed in order to raise the back rest 38 from a reclined toward a upright position. In order to avoid holding the switch 56 depressed during the time that the mechanism raises the chair to its full extent of travel, a lock pin 274, as is best shown in FIGURE 26, is fixed in casing 273 and cooperates with a slot 275 which is provided in barrel member 276. Barrel member 276 is lightly biased outwardly to the left, as is shown in FIGURE 26, by a spring, not shown. The finger-engaging portion of the switch 56 is provided with a reduced section to provide a grip 278. A knurled fitment 279 is provided with a bead 280 and frictionally connects the grip portion 278 to the barrel 276 for movement therewith. As the switch 56 is depressed, lock pin 274 rides in slot 275 and, upon slight rotation of the grip portion 278 and barrel member 276 in a counterclockwise direction, as viewed in FIGURES 25 and 27, a shoulder 280 is positioned for engagement with the lock pin 274 when the pressure on the switch 56 is released and the switch 56 is biased outwardly by the spring, not shown. During rotation of the grip portion 278 and barrel 276, the cam 272 engages the free edge portion of the extension arm 268 and distorts the leaf spring 260 from the position shown in FIGURES 24 and 25 to the position shown in FIGURES 26 and 27. The portion of the spring 260 near the ears 264 is precluded from movement by the stop lug 262 such that the spring 260 becomes pronouncely bowed and moved toward contact with the finger-engaging portion of the switch 55. The switch 56 remains in active position and the chair 10 moves from a reclined position to a fully upright position whereupon ball nut 100 on the screw 87 actuates the limit switch 64 so as to turn off the motor 62. At the start of the next operation, after the patient is seated, the switch 55 is depressed, so as to move the chair 10 toward a reclined position, and the bowed portion of spring 260 is flattened and causes the extension arm 268 to rotate the switch 56 through engagement with the cam 272, and cause shoulder 280 to become disengaged with the lock pin 274. As a result, the switch 56 is forced outwardly, by its biasing spring, to its inactive position. Switch 55 may also be provided with a lock pin 282 and a slot 283, if so desired.

FIGURES 30 and 31 illustrate the controls 28' for the assistant's side of the chair 10. Rocker switch 29' is actuated to raise and lower the chair 10, pushbutton switch 55' is actuated to move the chair 10 to a reclined position, and pushbutton switch 56' is pushed to raise the chair 10 to its upright position. As previously pointed out, switches 55' and 56' can operate the chair 10 only in the absence of an overriding signal from the dentist's switches 55 and 56.

FIGURES 32–35 illustrate a modified version of a chair, generally indicated by the numeral 300, which includes a two-piece back rest comprising a lower portion 304 and a separable top portion 306. The top portion 306 is adapted to be equipped with the adjustably mounted head rest 24 in the same manner as was described in connection with the FIGURES 20 and 21.

The separable top portion 306 is provided with a support rod 308 which is fixedly secured thereto on brackets 310. A pair of channel members 312 and 314 are fixedly secured to a back portion 316, and cooperate with the plate member 318 to provide a guide slot 320 which is adapted to receive the support rod 308 therein. A stop member 322 is pivotally mounted upon the channel member 314 by a pivot pin 324 so that a portion of the stop member 322 extends into the slot 320 and is adapted to engage support rod 308 and hold the same in a vertically adjusted position. The stop member 322 carries a strike plate 326 which is connected to a biasing spring 328 mounted upon a hook member 330 which is fixed to one of the bracket member 314. Strike plate 326 is disposed for engagement by a spring-loaded plunger 332 which is mounted on an upright side of the lower portion 304. The upper portion 306 can be adjusted relative to the lower portion 304 by depressing the plunger 332 and moving the upper portion 306 to the desired vertical position, and releasing plunger 332 so that spring 328 biases the stop member 322 into holding engagement with the support rod 308. From the foregoing, it will be apparent that the chair 300 is adapted for use with the upper portion 306 and head rest 24, and the chair 300 is also adaptable for use with previously known types of traditional head rests. More important, should a future design of a head rest be introduced into the profession, the removable top portion 306 can be changed without changing the entire back.

Another feature of the chair 300 is that the back rest portion 306 may be removed, and the strap 25 of head rest 24 may be inserted into the guide slot 320 so as to place the head rest 24 upon the lower portion 304 and thus adapt the chair 300 for use with children instead of adults.

FIGURES 36 and 37 illustrate a modification of the invention wherein a pair of laterally disposed thrust bars 400 each include an inner U-shaped channel member 402 which is nested within an outer U-shaped channel member 404. Each of the channel members 404 is provided with a rotatably mounted roller 406 for cooperation with the leg rest 34. Channel members 402 and 404 are each provided with adjustment holes 408 and 410, respectively. Suitable lock pins, or spring-loaded catch members, not shown, are provided for placement within aligned pairs of holes 408 and 410 for adjustably positioning the channel member 404 with respect to the channel member 402. As is apparent from a consideration of FIGURE 37, movement of the roller 406 from the full-line position to the dotted-line position, prior to actuation of the chair reclining-mechanism, results in deactivating the thrust bars and prevents upward motion of the leg rest 34 and seat rest 36. Conversely, if it is desired to separately adjust the leg rest 34 and seat rest 36, relative to the back rest 38, channel members 402 and 406 may be unlocked from each other and channel member 404 may be extended to the right, as viewed in FIGURE 37, thus causing the leg rest 34 and seat rest 36 to pivot upwardly.

Another modified form of the invention is illustrated in FIGURES 38 and 39. A pair of cover plates 420 are pivotally mounted to the leg rest 34 by a pair of pivot pins 422 carried by mounting brackets 424 and overlie openings 426. With the cover plates 420 free to pivot about the pivot pins 422, actuation of the chair reclining mechanism causes the thrust bars 124 and 126 to raise the cover plates 420 without any corresponding movement of the leg rests 34 and seat rest 36. Accordingly, only the leg rest portion of cushion member 15 is raised and no movement of the seat rest portion of the cushion member 15 occurs.

Another modification of the invention is illustrated in FIGURES 40 and 41. In this form of the invention, a separate motor and gear-reducer 450 is mounted on the underside of the leg rest 34 and includes a connector 452 fixedly connected to a drive shaft 454. A pair of crank arms 456 are secured to the drive shaft 454 for rotation therewith. A thrust bar 458 is pivotally secured, at 460 to a bracket 462 which is fixedly secured to the underside of the leg rest 34. Thrust bar 458 is also pivotally connected to the crank arms 456 by a pivot pin 464. When motor 450 is operated, rotation of drive shaft 454 and crank arms 456 causes the leg rest 34 to pivot upwardly relative to pivot pin 464. If it is desirable only to change the position of the leg rest 34, it is necessary to remove plates 160 from the cross head 71 so that the extension 152 of bracket 148 is free to pivot relative to the cross head 71. As a result, the motor 450 will cause the leg rest 34 to rotate about pivot 150. If plates 160 are not removed, it should be noted that motor 450 is capable of causing the chair 10 to be adjusted toward a reclined or upright position. In such a case, motor 450 will cause the leg rest 34 to pivot upwardly about the roller 156, thus causing the seat rest 36 and back rest 38 to move toward and away from the positions illustrated in FIGURES 15 and 16.

In each of the various embodiments of the invention, it is desirable that the various linkages operate smoothly so as not to cause patient apprehension. Accordingly, counterweight 480 is preferably mounted upon the leg rest 34 beneath the leg rest portion of cushion member 15, as is best shown in FIGURES 5 and 6. The counterweight 480 compensates for any looseness in the operating mechanisms and also assists the motor 62 during the time that the chair 10 is being raised to its upright position.

While preferred forms and arrangement of parts have been shown in illustrating the invention, it is to be clearly understood that various changes in details and arrangements of parts may be made without departing from the spirit and scope of the invention, as defined in the appended claimed subject matter.

We claim:
1. A chair including a back rest, a seat rest and a leg rest; first means pivotally connecting said leg rest to said seat rest, second means pivotally connecting said seat rest to said back rest, motor means mounted on said seat rest and carried thereby, thrust means operatively connected between said back rest and said leg rest, means connecting said back rest to said motor means for moving said back rest relative to said seat rest to actuate said thrust means for moving said leg rest relative to said back rest, and said seat rest, cushion means disposed over said seat rest and leg rest and extending without interruption from a rearward portion of said seat rest to a lower portion of said leg rest for providing a continuous uninterrupted supporting surface for all positions of said seat rest and said leg rest relative to each other; said first means comprising bracket means fixedly attached to said seat rest and depending therefrom, a link fixedly attached to the underside of said leg rest, and a pivot shaft connecting said bracket means to said link and providing for relative movement therebetween; said crosshead being positioned below and connected to said seat rest, and cam means operatively connecting said link and said crosshead, whereby movement of said leg rest relative to said crosshead causes movement of said seat rest relative to said crosshead and leg rest.

2. A chair including a back rest, a seat rest and a leg rest; first means pivotally connecting said leg rest to said seat rest, second means pivotally connecting said seat rest to said back rest, motor means mounted on said seat rest and carried thereby, thrust means operatively connected between said back rest and said leg rest, and means connecting said back rest to said motor means for moving said back rest relative to said seat rest to actuate said thrust means for moving said leg rest relative to said back rest and said seat rest, said thrust means comprising at least one pair of channel members disposed in nested relation, and adjustment means for varying the effective length of said pair of channels to vary the inclination of said leg rest with respect to said seat rest.

3. A chair including a back rest, a seat rest and a leg rest; first means pivotally connecting said leg rest to said seat rest, second means pivotally connecting said seat rest to said back rest, motor means mounted on said seat rest and carried thereby, thrust means operatively connected between said back rest and said leg rest, and means connecting said back rest to said motor means for moving said back rest relative to said seat rest to actuate said thrust means for moving said leg rest relative to said back rest and said seat rest, supporting structure for said leg rest provided with an opening in alignment with said thrust means, a plate member covering said opening, and pivot means mounting said plate member on said leg rest, said plate member being pivotable upwardly from said leg rest whereby said thrust means is extendable through said opening without varying the position of said leg rest relative to said seat rest.

4. A chair including a back rest, a seat rest and a leg rest; first means pivotally connecting said leg rest to said seat rest, second means pivotally connecting said seat rest to said back rest, motor means mounted on said seat rest and carried thereby, thrust means operativelyl connected between said back rest and said leg rest, and means connecting said back rest to said motor means for moving said back rest relative to said seat rest to actuate said thrust means for moving said leg rest relative to said back rest and said seat rest, second motor means mounted on the underside of said leg rest, and crank means connected between said second motor means and said seat rest for selectively varying the position of said leg rest relative to said seat rest.

5. A dental chair comprising a back rest and a seat rest, a pair of vertically disposed support plate members fixedly secured to said seat rest along the lateral side edges adjacent the rearmost portion of said seat rest, a pair of lateral flange portions integral with said back rest adjacent the lowermost portion thereof, and means pivotally connecting said flange portions to said support plate members; a chair base including a lift unit located beneath said seat rest, a crosshead fixedly secured to said lift unit, pivot block means mounted for pivotal movement on said crosshead at a rear portion thereof, means for connecting said seat rest to said pivot block means to provide for pivotal movement of said seat rest relative to said crosshead, motor means fixed to the underside of said seat rest and including a pair of parallel screws located adjacent to the lateral edges of said seat rest, a generally U-shaped yoke member having its bight portion pivotally connected to said back rest at a point below the pivotal connection of said flange portions to said support plate members; a pair of nut members each mounted for movement on a respective one of said pair of parallel screws, each leg of said U-shaped yoke member being pivotally connected to a respective one of said nut members whereby movement of said nut members along said pair of parallel screws causes said U-shaped yoke member to pivot said back rest about the pivotal connection of said flange portions to said support plate member.

6. A dental chair as defined in claim 5 including a leg rest, bracket means fixed to a forward portion of said seat rest and depending therefrom, a link fixedly connected to said leg rest and pivotally connected to the bracket means on said seat rest, a guide slot formed on said crosshead, said link including an extension mounted for movement within said guide slot, a pair of thrust bars each having a rearward end pivotally mounted on a respective leg of said U-shaped yoke member, guide means on said leg rest, the forward end of each of said thrust bars being mounted for movement in said guide means on said leg rest, whereby actuation of said motor means causes simultaneous pivotal motion of said back rest, said leg rest and said seat rest relative to said crosshead and to each other.

7. A dental chair as defined in claim 5 including an arm rest disposed above a lateral edge of said seat rest, means pivotally mounting said arm rest on one of said lateral flange portions of said back rest, and linkage means connected between said arm rest and one of said support plate members on said seat rest for maintaining said arm rest substantially parallel to said seat rest during pivotal movement of said back rest relative to said seat rest.

8. A dental chair as defined in claim 6 including an arm rest disposed above a lateral edge of said seat rest, means pivotally mounting said arm rest on one of said lateral flange portions of said back rest, and linkage means connected between said arm rest and one of said support plate members on said seat rest for maintaining said arm rest substantially parallel to said seat rest during pivotal movement of said back rest relative to said seat rest.

References Cited

UNITED STATES PATENTS

| | | | |
|---|---|---|---|
| 2,579,502 | 12/1951 | Lorenz | 297—79 |
| 2,714,922 | 8/1955 | McKibbon et al. | 297—83 |
| 2,980,170 | 4/1961 | Bechtold | 297—417 |
| 2,987,116 | 6/1961 | Golden | 297—327 |
| 3,014,757 | 12/1961 | Pilcher et al. | 297—85 |
| 3,016,264 | 1/1962 | Hughes | 297—69 |
| 3,025,108 | 3/1962 | Teague | 297—327 |
| 3,142,509 | 7/1964 | Ehrke et al. | 297—71 X |
| 3,172,699 | 3/1965 | Naughton | 297—417 X |
| 3,191,990 | 6/1965 | Rugg et al. | 297—83 |
| 3,311,407 | 3/1967 | Horie | 297—71 |

JAMES T. McCALL, *Primary Examiner.*

DAVID J. WILLIAMOWSKY, *Assistant Examiner.*